(12) United States Patent
Mineno et al.

(10) Patent No.: US 8,961,023 B2
(45) Date of Patent: Feb. 24, 2015

(54) BALL BEARING RETAINER AND BALL BEARING

(75) Inventors: Katsunori Mineno, Iwata (JP); Ikuo Fujiniwa, Iwata (JP); Mitsuhiro Nakayama, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/000,912

(22) PCT Filed: Feb. 20, 2012

(86) PCT No.: PCT/JP2012/053968
§ 371 (c)(1), (2), (4) Date: Aug. 22, 2013

(87) PCT Pub. No.: WO2012/120996
PCT Pub. Date: Sep. 13, 2012

(65) Prior Publication Data
US 2013/0330031 A1    Dec. 12, 2013

(30) Foreign Application Priority Data

Mar. 9, 2011  (JP) .................... 2011-051744
Jun. 6, 2011  (JP) .................... 2011-126350

(51) Int. Cl.
*F16C 33/38* (2006.01)
*F16C 33/66* (2006.01)
*F16C 19/06* (2006.01)

(52) U.S. Cl.
CPC ......... *F16C 33/6659* (2013.01); *F16C 33/3875* (2013.01); *F16C 33/3887* (2013.01);
(Continued)

(58) Field of Classification Search
CPC ............. F16C 33/3875; F16C 33/6614; F16C 33/6651

USPC .................. 384/470, 523, 526, 528, 530, 533
See application file for complete search history.

(56) References Cited

U.S. PATENT DOCUMENTS 3,586,405 A  *  6/1971  Claesson .................... 384/526
4,451,098 A      5/1984  Farley et al.
(Continued)

FOREIGN PATENT DOCUMENTS

| JP | 59-58229 | 4/1984 |
|---|---|---|
| JP | 3-24323 | 2/1991 |

(Continued)

OTHER PUBLICATIONS

International Search Report mailed Apr. 10, 2012 in International (PCT) Application No. PCT/JP2012/053968.
International Preliminary Report on Patentability and Written Opinion of the International Searching Authority mailed Sep. 19, 2013 in International (PCT) Application No. PCT/JP2012/053968.

*Primary Examiner* — Phillip A Johnson
(74) *Attorney, Agent, or Firm* — Wenderoth, Lind & Ponack, L.L.P.

(57) ABSTRACT

A ball bearing retainer includes two annular members that face each other in an axial direction. The two annular members have opposed surfaces each including hemispherical pockets that are formed at a plurality of positions in a circumferential direction and configured to receive balls. The opposed surfaces are snap-fitted to each other so as to couple the two annular members to each other with coupling portions provided at both circumferential end portions of each of the hemispherical pockets Inner peripheral surfaces of the hemispherical pockets of the two annular members and the opposed surfaces of the two annular members have recessed grooves that are opened by extending from radially inner surfaces of the two annular members and reaching radially outer surfaces of the two annular members.

18 Claims, 14 Drawing Sheets

(52) U.S. Cl.
CPC ......... *F16C2240/46* (2013.01); *F16C 2361/65* (2013.01); *F16C 33/6674* (2013.01); *F16C 19/06* (2013.01); *F16C 2226/76* (2013.01); *F16C 33/6681* (2013.01); *F16C 2226/74* (2013.01)
USPC .......................................... 384/470; 384/530

(56) References Cited

U.S. PATENT DOCUMENTS

| | | | |
|---|---|---|---|
| 4,626,113 A * | 12/1986 | Forknall et al. | 384/530 |
| 4,902,145 A | 2/1990 | Johnson | |
| 7,507,028 B2 * | 3/2009 | Markle | 384/523 |
| 8,408,808 B2 * | 4/2013 | Hosmer | 384/523 |
| 2012/0060634 A1 * | 3/2012 | Ueno | 74/458 |

FOREIGN PATENT DOCUMENTS

| | | | |
|---|---|---|---|
| JP | 04-236820 | | 8/1992 |
| JP | 2002-130294 | | 5/2002 |
| JP | 2004263819 A | * | 9/2004 |
| JP | 2006-342901 | | 12/2006 |
| JP | 2007-040383 | | 2/2007 |
| JP | 2008-121817 | | 5/2008 |
| JP | 2008-286387 | | 11/2008 |
| JP | 2009-019766 | | 1/2009 |
| JP | 2009-115128 | | 5/2009 |
| JP | 2011-021671 | | 2/2011 |

* cited by examiner

BALL BEARING RETAINER AND BALL BEARING

TECHNICAL FIELD

The present invention relates to a synthetic-resin ball bearing retainer, which is configured to retain balls in a freely reliable manner, and to a ball bearing in which the retainer is interposed between an outer race and an inner race.

BACKGROUND ART

For example, in a gear support shaft of a transmission of a vehicle including an engine, various types of ball bearings, such as a deep groove ball bearing and an angular contact ball bearing, are widely used.

A ball bearing of this type includes the following main components: an inner race having a radially outer surface in which an inner raceway surface is formed; an outer race arranged on an outer side of the inner race, and having a radially inner surface in which an outer raceway surface is formed; a plurality of balls interposed between the inner raceway surface of the inner race and the outer raceway surface of the outer race in a freely reliable manner; and a retainer arranged between the inner race and the outer race, for retaining the balls equiangularly. Any one of the inner race and the outer race is mounted to a stationary part such as a housing, and another one of the inner race and the outer race is mounted to a rotary part such as a rotation shaft.

In particular, drive motors for electric vehicles and hybrid vehicles tend to be downsized and rotated at high speed for higher efficiency, and hence the rotary part such as the rotation shaft is rotated at high speed in accordance therewith. As a result, there arise problems of deformations of a retainer due to a lack of lubrication, torque (heat generation), a centrifugal force, and the like. The deformations of the retainer due to the lack of lubrication and the torque (heat generation) can be solved by appropriately designing a shape of the retainer. Further, the deformation of the retainer due to the centrifugal force can be suppressed by using a lightweight retainer made of a synthetic resin.

There have been proposed various lightweight retainers made of the synthetic resin for the purpose of suppressing the deformation of the retainer due to the centrifugal force. Examples of the retainer of this type include a retainer having a crown shape including a circular main part, pairs of elastic pieces equiangularly and integrally provided at intervals to project from a surface on one side in an axial direction of the main part, and pockets that are provided in a recessed form between the pairs of the elastic pieces and retain balls in a freely reliable manner. In this crown-shaped retainer, the balls are held from only one side. Thus, when a great centrifugal force is applied, due to irregular deformation, the balls may drop off from the pockets, or interfere with other components such as the inner race and the outer race.

In order to eliminate such risks, there have been proposed various retainers of an axial coupling type, for retaining the balls from both sides (for example, refer to Patent Literature 1). The retainer disclosed in Patent Literature 1 has a structure in which a pair of annular members are coupled to each other in an axial direction. The pair of annular members each include an annular proximal portion and post portions integrally provided at equal intervals to project upright from each of the annular proximal portions. The pair of annular members are opposed to each other in a manner that the post portions of one of the annular members are snatched with midpoints between the post portions of another of the annular members. Then, the pair of annular members are coupled to each other so as to form pockets for retaining the balls between the post portions adjacent to each other.

CITATION LIST

Patent Literature 1: JP 2009-115128 A

SUMMARY OF INVENTION

Technical Problems

In recent years, torque reduction of automotive ball bearings is required also in view of environmental issues for higher fuel efficiency and the like. Examples of torques generated in a ball bearing used in oil-bath lubrication include a torque generated between the retainer and the balls, and resistance against shearing by the balls with respect to the lubricating oil occupies a large proportion of the torque generated therebetween. Further, the resistance against the shearing is generated mostly at the time of shearing oil films formed between inner peripheral surfaces of the pockets and radially outer surfaces of the balls received in the pockets.

By the way, as in the retainer of the axial coupling type disclosed in Patent Literature 1, when the inner peripheral surface of the pocket is formed of a uniform curved surface in conformity with an outer shape of the ball, an area of the inner peripheral surface of the pocket covering the ball is larger than that of the crown-shaped retainer. As a result, when a lubricating oil passes through a minute gap between the inner peripheral surface of the pocket and the radially outer surface of the ball, the resistance against the shearing with respect to the lubricating oil becomes higher. The higher shearing resistance constitutes one of factors in increasing the torque (heat generation) in the bearing.

Under the circumstances, the present invention has been proposed in view of the problems described above, and it is an object thereof to provide a ball bearing retainer and a ball bearing that are capable of easily reducing torque generated by resistance against shearing by balls with respect to a lubricating oil.

Solution to Problems

As technical means for attaining the above-mentioned object, according to the present invention, there is provided a ball bearing retainer, comprising two annular members that face each other in an axial direction, the two annular members having opposed surfaces each comprising hemispherical pockets that are formed at a plurality of positions in a circumferential direction and configured to receive balls, the opposed surfaces being snap-fitted to each other so as to couple the two annular members to each other with coupling portions provided at both circumferential end portions of each of the hemispherical pockets. The hemispherical pockets each comprise lubricating-oil relief recessed grooves provided in an inner peripheral surface thereof.

In the present invention, the lubricating-oil relief recessed grooves are provided in the inner peripheral surface of each of the hemispherical pockets, and hence a gap between a radially outer surface of each of the balls and an inner peripheral surface of each of the hemispherical pockets is enlarged. As a result, a lubricating oil more smoothly flows through the gap. Thus, resistance against shearing by the balls with respect to the lubricating oil can be suppressed, with the result that torque can be easily reduced.

Note that, the present invention may provide a structure in which the lubricating-oil relief recessed grooves are each formed to extend from a radially inner surface of each of the two annular members and reach a radially outer surface of the each of the two annular members. A shape of each of the lubricating-oil relief recessed grooves in cross-section may comprise any one of a circular-arc shape and an angular shape, which is arbitrarily determined. Further, the present invention may provide a structure in which the lubricating-oil relief recessed grooves each have a C-shape comprising: a central main-body groove extending along the circumferential direction of the hemispherical pockets; and minor grooves provided continuously with end portions of the central main-body grooves and opened in a radially outer surface of each of the two annular members. Still further, in addition to the lubricating-oil relief recessed grooves, the present invention may provide a structure in which the opposed surfaces of the two annular members each comprise a recessed groove that extends from the radially inner surface of the each of the two annular members and reaches the radially outer surface of the each of the two annular members.

With the provision of the lubricating-oil relief recessed grooves as described above, lubricant relief portions can be formed on an internal side of each of the hemispherical pockets. Thus, resistance generated at the time of passage of a lubricant through the internal side of each of the hemispherical pockets can be reduced. Further, an amount of oil films to be formed between the balls and the hemispherical pockets can be reduced. In addition, foreign matter can be quickly discharged to an outside without being accumulated in the ball bearing retainer.

According to the present invention, it is desired that an end surface on a counter-coupling side of the each of the two annular members be formed into a flat shape. When the flat shape is employed in this way, agitation resistance of the lubricant can be reduced.

According to the present invention, it is desired to provide a structure in which the coupling portions each comprise: a radially outer side projecting portion formed by socially extending a radially outer side of the circumferential end portion of the each of the hemispherical pockets of one of the two annular members so as to allow an inner peripheral surface of the radially outer side projecting portion to abut against the rolling elements; a radially inner side recessed portion formed by recessing a radially inner side of the circumferential end portion; a radially inner side projecting portion formed by axially extending a radially inner side of the circumferential end portion of the each of the hemispherical pockets of another of the two annular members so as to allow an inner peripheral surface of the radially inner side projecting portion to abut against the rolling elements; and a radially outer side recessed portion formed by recessing a radially outer side of the circumferential end portion; the radially outer side projecting portion and the radially inner side projecting portion are engaged with each other in the axial direction by inserting the radially outer side projecting portion into the radially outer side recessed portion and by inserting the radially inner side projecting portion into the radially inner side recessed portion; and an engagement surface of the radially outer side projecting portion and an engagement surface of the radially inner side projecting portion are inclined with respect to the axial direction in a manner that the radially outer side projecting portion and the radially inner side projecting portion are each thicker on a distal end side than on a proximal end side.

With this, when the radially outer side projecting portion and the radially inner side projecting portion are engaged with each other in the axial direction, a friction force is generated along each of the engagement surface of the radially outer side projecting portion and the engagement surface of the radially inner side projecting portion. Further, the engagement surface of the radially outer side projecting portion and the engagement surface of the radially inner side projecting portion are inclined with respect to the axial direction in a manner that the radially outer side projecting portion and the radially inner side projecting portion are each thicker on the distal end side than on the proximal end side. As a result, an axial component of a reactive force generated in a normal direction of each of the engagement surface of the radially outer side projecting portion and the engagement surface of the radially inner side projecting portion is provided. The frictional force generated along each of the engagement surface of the radially outer side projecting portion and the engagement surface of the radially inner side projecting portion, and the axial component of the reactive force generated in the normal direction of each of the engagement surfaces are applied synergistically with each other. Thus, even when a great centrifugal force is applied due to high rotation, the two annular members are reliably prevented from being separated from each other in the axial direction.

According to the present invention, it is desired to provide a structure in which, in each of the coupling portions, an inclination angle of the engagement surface of the radially outer side projecting portion and an inclination angle of the engagement surface of the radially inner side projecting portion are each set to 5° or more. When the inclination angles are set to this value, deformation of the engagement surfaces at the time of application of a great centrifugal force due to high rotation can be easily suppressed. As a result, the axial component of the reactive force can be reliably applied to each of the engagement surfaces, and hence a force of coupling the two annular members to each other can be easily secured. Note that, when the inclination angles of the engagement surfaces are each less than 5°, in the case where a great centrifugal force is applied due to high rotation, the deformation of the engagement surfaces is difficult to suppress. As a result, the axial component of the reactive force is difficult to reliably apply to the engagement surfaces.

According to the present invention, it is desired to provide a structure in which, in the each of the coupling portions, the radially inner side projecting portion is formed to be thicker than the radially outer side projecting portion. With this, at the time of the application of a great centrifugal force due to high rotation, the radially inner side projecting portion is deformed more significantly than the radially outer side projecting portion. This is because the radially inner side projecting portion is larger than the radially outer side projecting portion not only in thickness but also in mass. Here, the engagement surface of the radially outer side projecting portion and the engagement surface of the radially inner side projecting portion are inclined with respect to the axial direction in a manner that the radially outer side projecting portion and the radially inner side projecting portion are each thicker on the distal end side than on the proximal end side. Thus, the radially inner side projecting portion is deformed to increase a force of coupling the engagement surface of the radially outer side projecting portion and the engagement surface of the radially inner side projecting portion to each other.

According to the present invention, it is desired to provide a structure in which, in the each of the coupling portions, the radially outer side projecting portion and the radially inner side recessed portion are formed at one of the circumferential end portions of the each of the hemispherical pockets, and the radially inner side projecting portion and the radially outer side recessed portion are formed at another of the circumferential end portions of the each of the hemispherical pockets. With such a structure, annular members of one type, which are manufactured with the same die set, can be used as the one of the two annular members and the another of the two annular members. As a result, manufacturing cost can be reduced.

Note that, according to the present invention, it is effective that the two annular members be each made of a synthetic resin from the viewpoint of achieving a lightweight of the ball bearing retainer. It is preferred that the synthetic resin for forming the two annular members comprise any one selected from a polyamide resin, a polyether ether ketone resin, a polyphenylene sulfide resin, a polyphthalamide resin, and a polyamide imide resin.

A ball bearing may be constructed by adding an outer race and an inner race, which are rotated relative to each other, and balls interposed between the outer race and the inner race to the ball bearing retainer having the structure described above.

The present invention may provide the following structure. Specifically, the ball bearing further comprises: an outer flange portion provided to a radially outer portion on the counter-coupling side of the each of the two annular members and extending to the radially outer side; and an inner flange portion provided to a radially inner portion on the counter-coupling side of the each of the two annular members and extending to the radially inner side. When a clearance between the outer flange portion and a radially inner surface of the outer race is represented by B, and a clearance between the inner flange portion and a radially outer surface of the inner race is represented by A, a relationship of B≥A is satisfied.

Further, there may be employed the following structure. Specifically, an outer flange portion provided to a radially outer portion on the counter-coupling side of the each of the two annular members and extending to the radially outer side; and an inner flange portion provided to a radially inner portion on the counter-coupling side of the each of the two annular members and extending to the radially inner side. Outer end portions in a bearing axial direction of a radially inner surface of the outer race each comprise an outer race tapered surface radially expanding from an axially inner side toward an axially outer side. A radially outer end of the outer flange portion comprises a flange tapered surface radially expanding from the axially inner side toward the axially outer side. When a clearance between the flange tapered surface and the outer race tapered surface is represented by B, and a clearance between the inner flange portion and a radially outer surface of the inner race is represented by A, a relationship of B≥A is satisfied.

The outer flange portion and the inner flange portion are provided, and hence it is possible to restrict inflow of the lubricant into an inside of the ball bearing, and to prevent outflow of the lubricant from the inside to the outside of the ball bearing. In particular, by satisfying the relationship of B≥A, foreign matter that may remain in the inside of the ball bearing can be discharged to the outside while preventing the outflow of the lubricant to the outside of the ball bearing. Further, the outer end portion in the bearing axial direction of the radially inner surface of the outer race are each formed into the outer race tapered surface, and the radially outer end of the outer flange portion is formed into the flange tapered surface. With this, the foreign matter can be more effectively discharged to the outside.

It is desired that the ball bearing of the present invention be applied to a transmission. The transmission refers to a main speed change device for converting a drive force from an engine to speed and transmitting the drive force thus converted to a drive shaft and the like, and is roughly classified into a manual type and an automatic type. Further, depending on a drive system of a vehicle, the transmission also refers to a front-wheel drive (FWD) transaxle, a rear-wheel drive (RWD) transmission, and a four-wheel drive (4WD) transfer (auxiliary speed change device). The ball bearing is mounted so as to be interposed, for example, between a main shaft and a main drive gear.

Advantageous Effects of Invention

According to the present invention, the lubricating-oil relief recessed grooves are provided to the inner peripheral surface of each of the hemispherical pockets, and hence the gap between the radially outer surface of each of the balls and the inner peripheral surface of each of the hemispherical pockets is enlarged. As a result, a lubricating oil more smoothly flows through the gap. Thus, the resistance against the shearing by the balls with respect to the lubricating oil can be suppressed. As a result, torque generated between the ball bearing retainer and the balls due to the resistance against the shearing by the balls with respect to the lubricating oil can be easily reduced. Thus, automotive ball bearings that are compliant with environmental issues for higher fuel efficiency and the like in recent years can be easily provided.

DESCRIPTION OF EMBODIMENTS

In the following, detailed description is made of a ball bearing retainer and a ball bearing according to embodiments of the present invention. Note that, the ball bearing according to the embodiments of the present invention is suitable particularly to a sealed ball bearing for transmissions, which is one of automotive high rotation bearings used in oil-bath lubrication in electric vehicles and hybrid vehicles. However, the ball bearing is applicable not only to the sealed ball bearing, but also to ball bearings for other uses.

Figure 15:
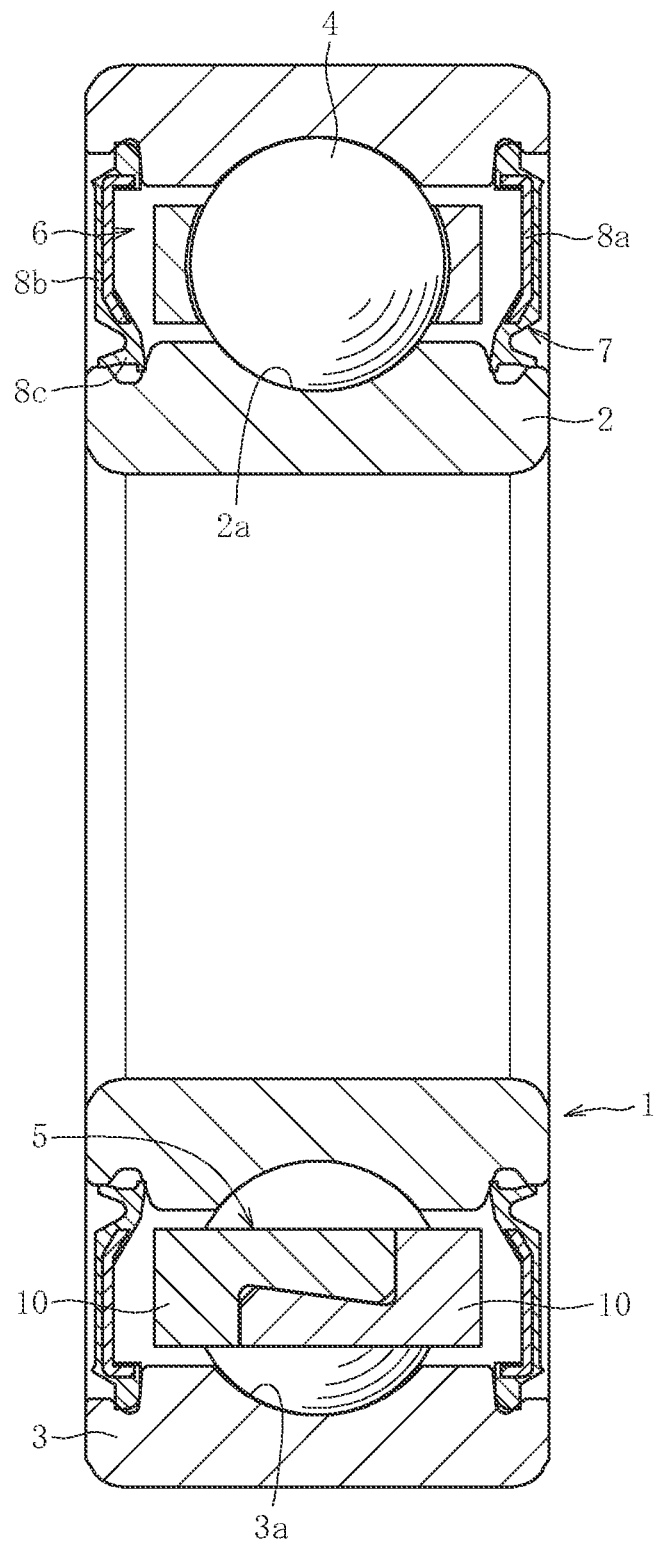
FIG. 15 is a sectional view illustrating an example of a ball bearing incorporating a retainer of the present invention.

As illustrated in FIG. 15, a ball bearing 1 according to the embodiments of the present invention comprises the following main components: an inner race 2 having a radially outer surface in which an inner raceway surface 2a is formed; an outer race 3 arranged on an outer side of the inner race 2 and having a radially inner surface in which an outer raceway surface 3a is formed; a plurality of balls 4 interposed between the inner raceway surface 2a of the inner race 2 and the outer raceway surface 3a of the outer race 3 in a freely reliable manner; a retainer 5 arranged between the inner race 2 and the outer race 3, for retaining the balls 4 equiangularly; and sealing portions 7 each comprising a sealing lip formed of an elastic member and arranged in an annular space 6 formed between the inner race 2 and the outer race 3.

In the embodiments of the present invention, the outer race 3 is mounted to a stationary part such as a housing, and the inner race 2 is mounted to a rotary part such as a rotation shaft. The sealing portions 7 each comprise a sealing member 8b formed of an elastic member such as rubber bonded integrally with a core metal 8a through vulcanization. The sealing member 8b comprises a proximal end portion mounted to a radially inner end portion of the outer race 3 on a stationary side, and a distal end portion having a sealing lip 8c held in contact with a radially outer end portion of the inner race 2. Note that, instead of an inner-race rotary type exemplified in the embodiments of the present invention, the ball bearing 1 is applicable also to an outer-race rotary type in which the inner race 2 is mounted to the stationary part such as the housing and the outer race 3 is mounted to the rotary part such as the rotation shaft.

Figure 1:
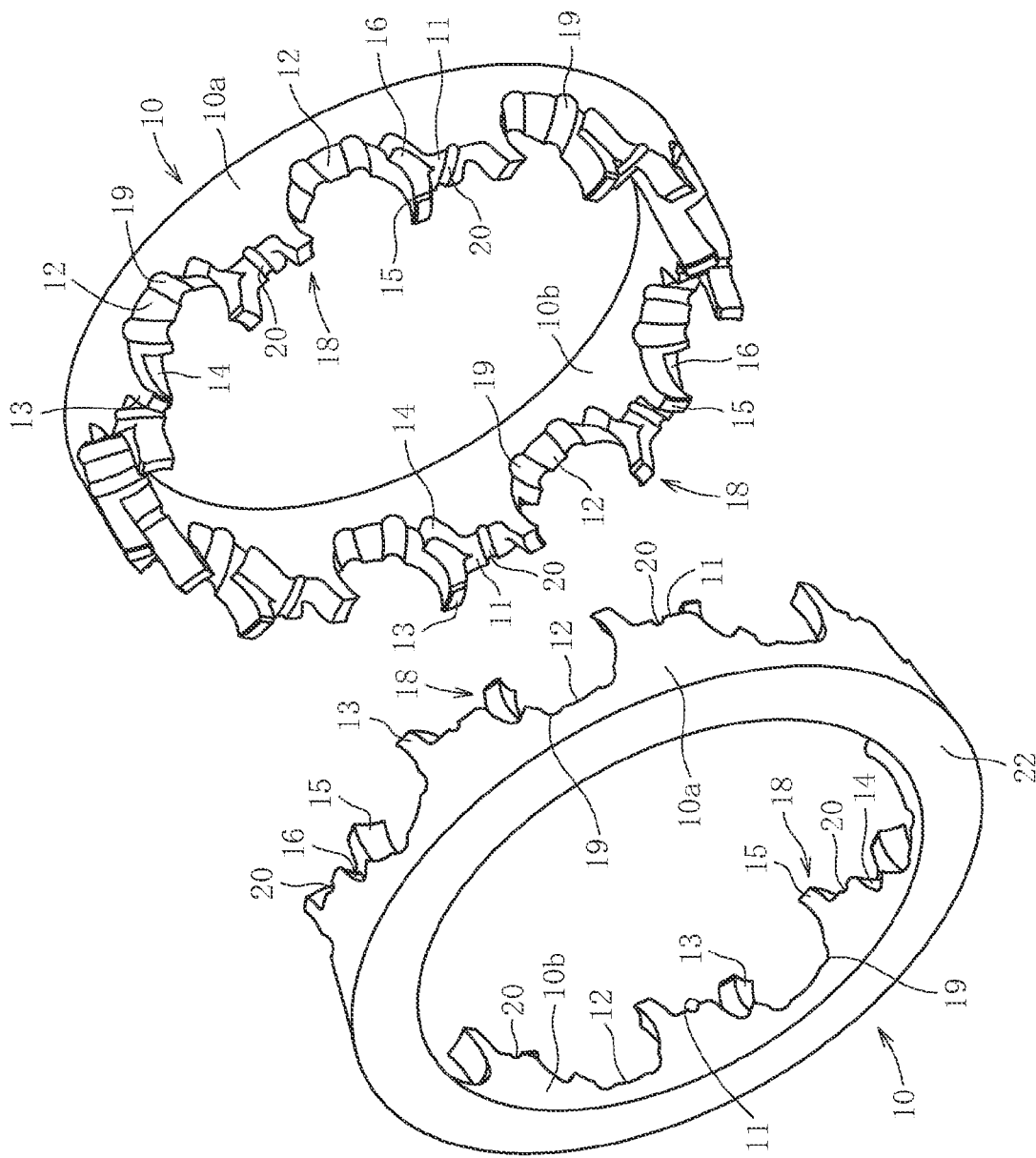
FIG. 1 is an exploded assembly perspective view illustrating a state before two annular members are coupled to each other according to an embodiment of the present invention.
Figure 2:
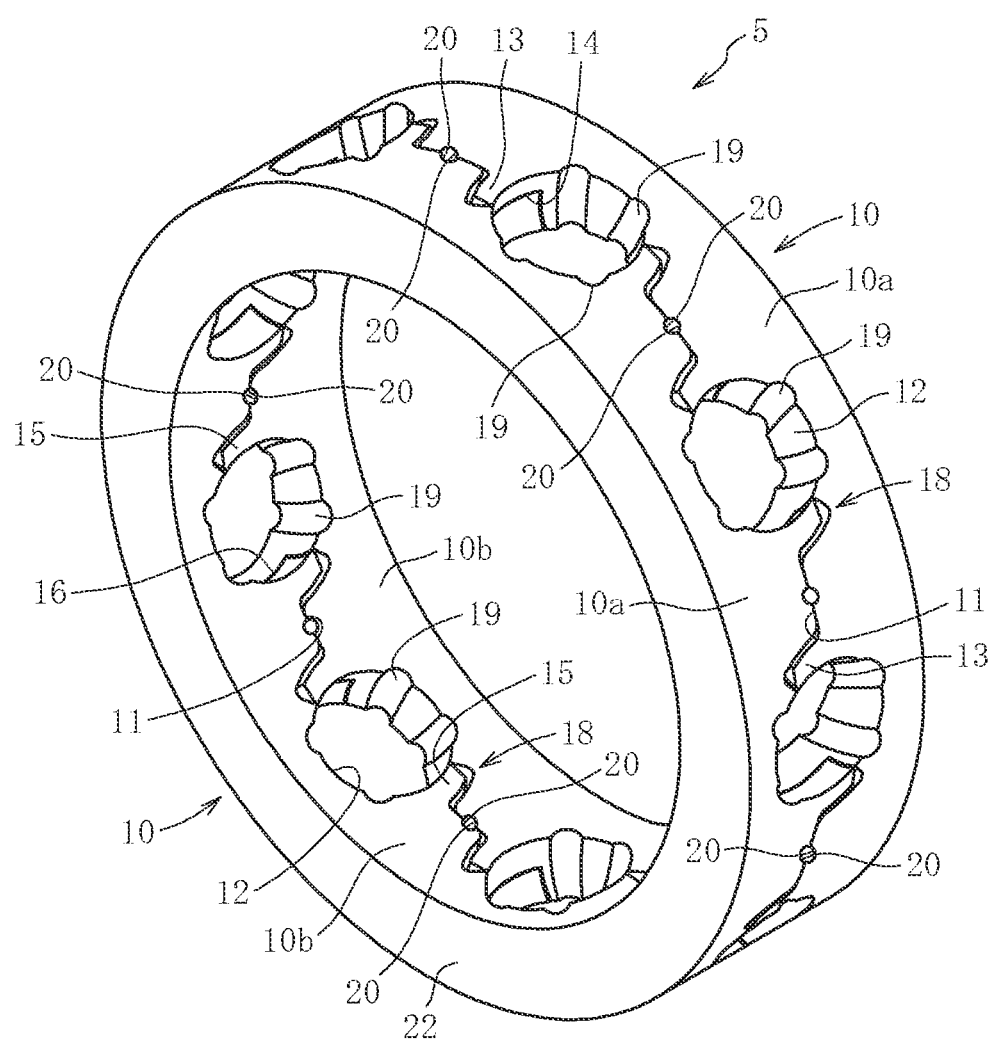
FIG. 2 is an assembly completion perspective view illustrating a state after the two annular members of FIG. 1 are coupled to each other.

The ball bearing 1 comprises the lightweight retainer 5 made of a synthetic resin so as to suppress deformation of the retainer 5 due to a centrifugal force in high speed rotation. As illustrated in FIGS. 1 and 2, the retainer 5 of this type comprises two annular members 10 facing each other in an axial direction and respectively having opposed surfaces 11 each having hemispherical pockets 12 that are formed at a plurality of positions in a circumferential direction and receive the balls 4 (refer to FIG. 15) in a freely reliable manner. The retainer 5 has a symmetrical shape in which the opposed surfaces 11 of the annular members 10 are snap-fitted to each other so as to couple the two annular members 10 to each other with coupling portions 18 provided at both circumferential end portions of each of the pockets 12. An inner peripheral surface of each of the pockets 12 of the annular members 10 has a concave spherical surface shape having a uniform radius of curvature.

Figure 3:
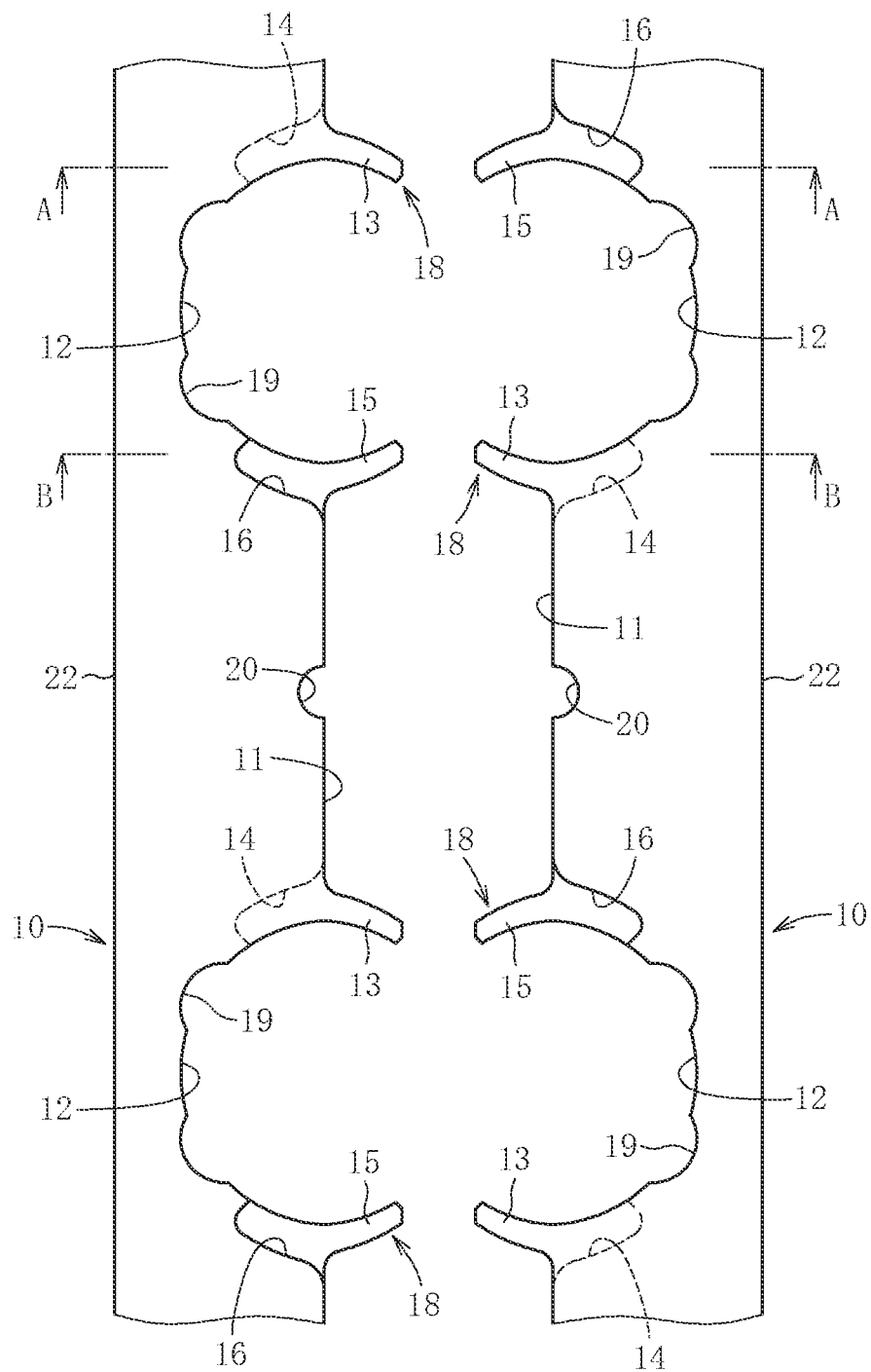
FIG. 3 is a partially developed view of the two annular members before the coupling.
Figure 4:
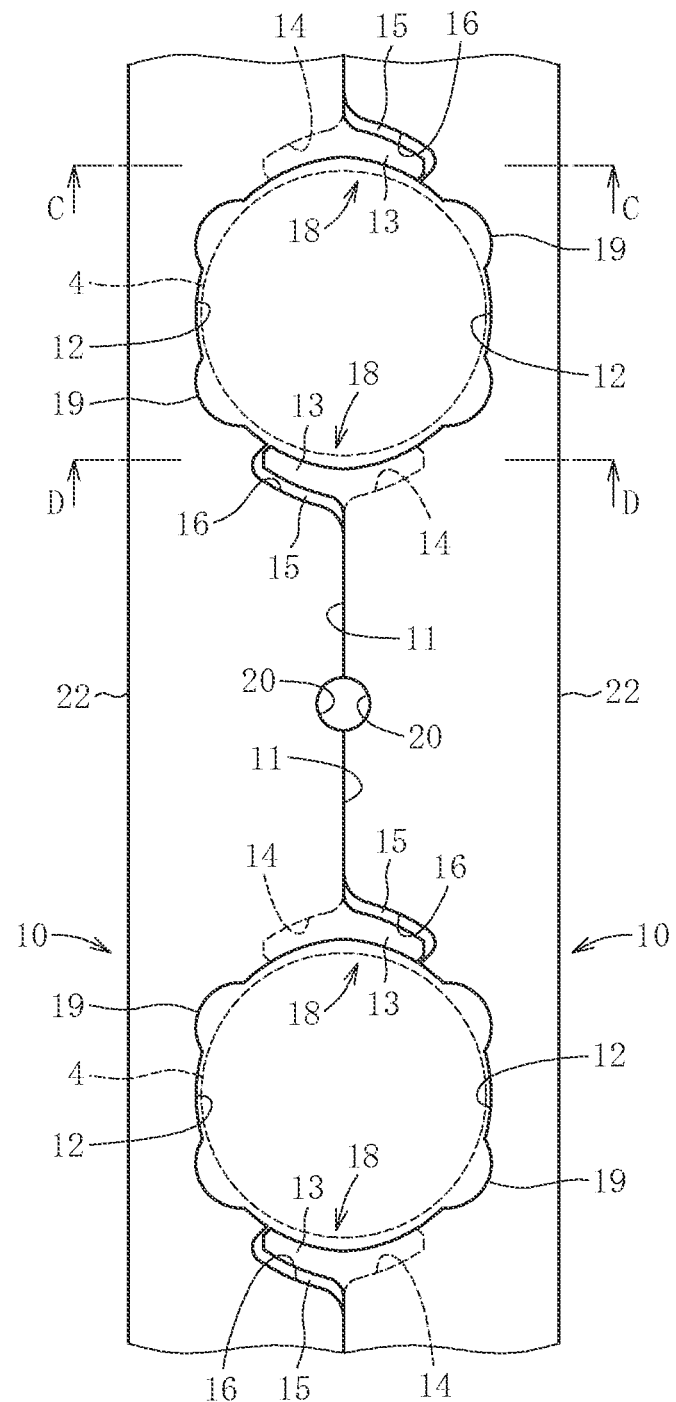
FIG. 4 is a partially developed view of the two annular members after the coupling.

FIGS. 1 to 4 illustrate one embodiment of the present invention. FIGS. 1 and 3 illustrate a state before the two annular members 10 are coupled to each other, and FIGS. 2 and 4 illustrate a state after the two annular members 10 are coupled to each other. As illustrated in FIGS. 1 to 4, in this embodiment, the inner peripheral surface of the pocket 12 has lubricating-oil relief recessed grooves 19 each having a circular-arc shape in cross-section. The recessed grooves 19 are formed at two positions on the inner peripheral surface of the pocket 12 of each of the annular members 10 in a manner of extending in a radial direction. Specifically, each of the recessed grooves 19 extends from a radially inner surface 10b of the annular member 10 and reaches a radially outer surface 10a thereof, and is opened in both the radially inner surface 10b and the radially outer surface 10a of the annular member 10 (refer to FIGS. 1 and 2). Further, the opposed surface 11 of the annular member 10 has a recessed groove 20 extending from the radially inner surface 10b of the annular member 10 and reaching the radially outer surface 10a thereof and opened in both the radially inner surface 10b and the radially outer surface 10a.

Figure 5:
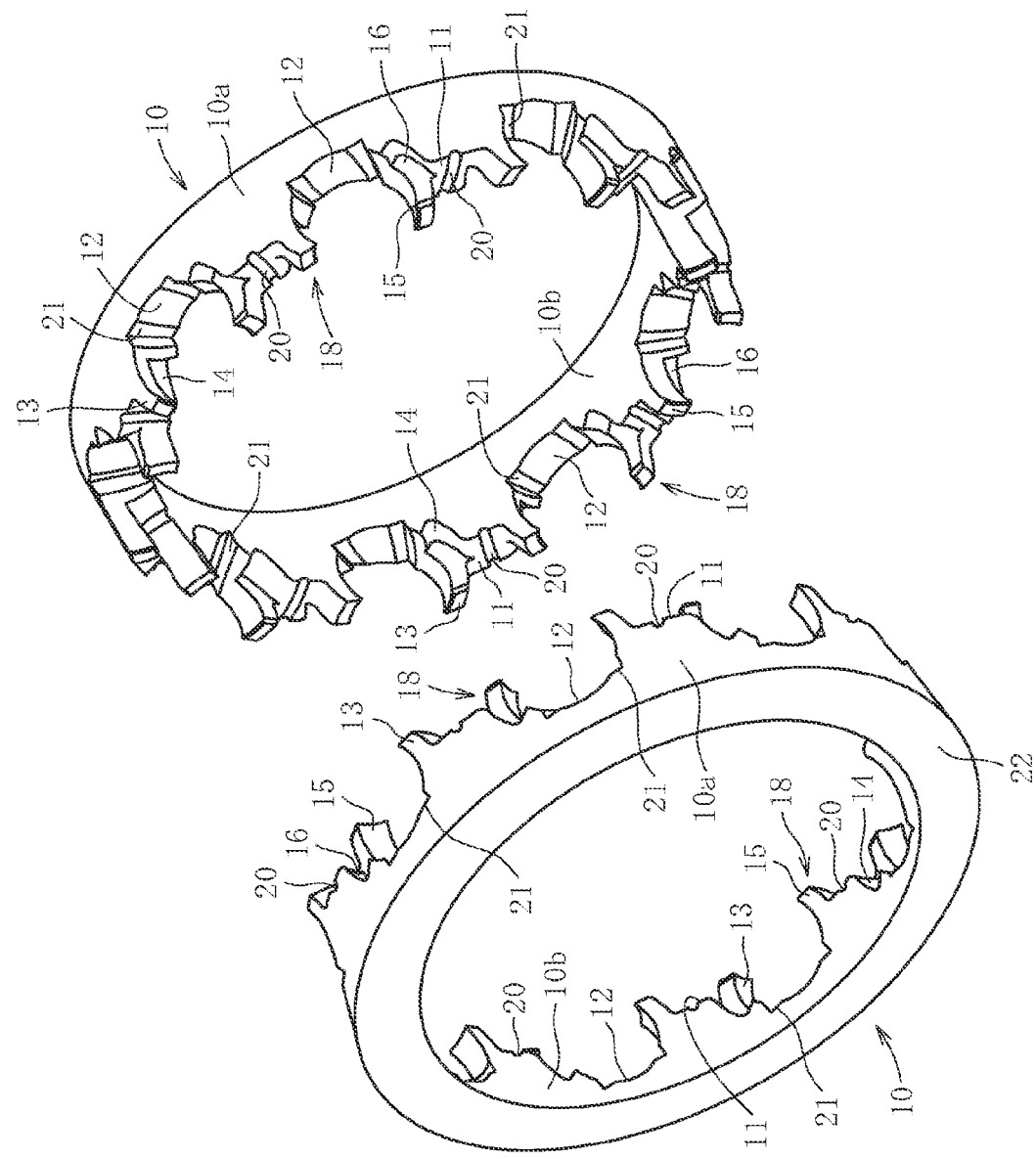
FIG. 5 is an exploded assembly perspective view illustrating a state before two annular members are coupled to each other according to another embodiment of the present invention.
Figure 6:
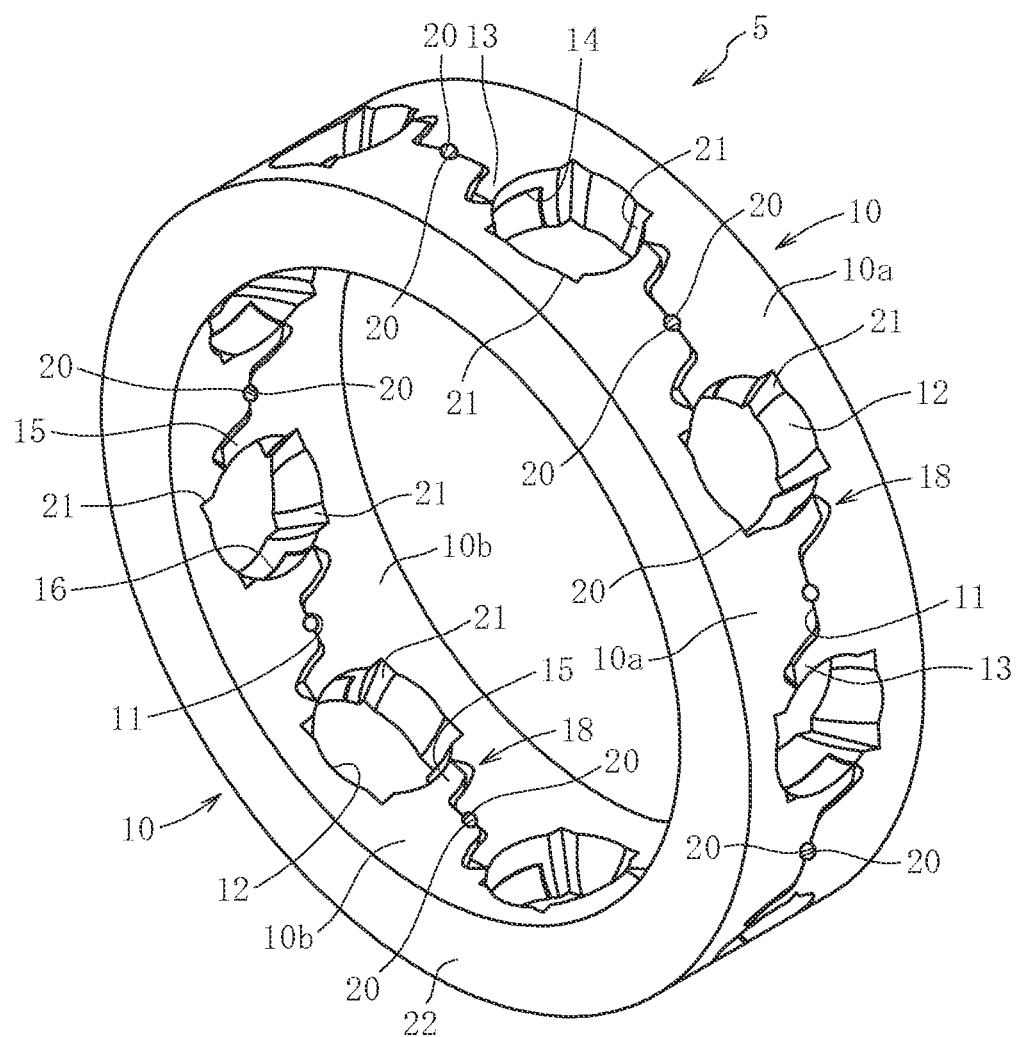
FIG. 6 is an assembly completion perspective view illustrating a state after the two annular members of FIG. 5 are coupled to each other.
Figure 7:
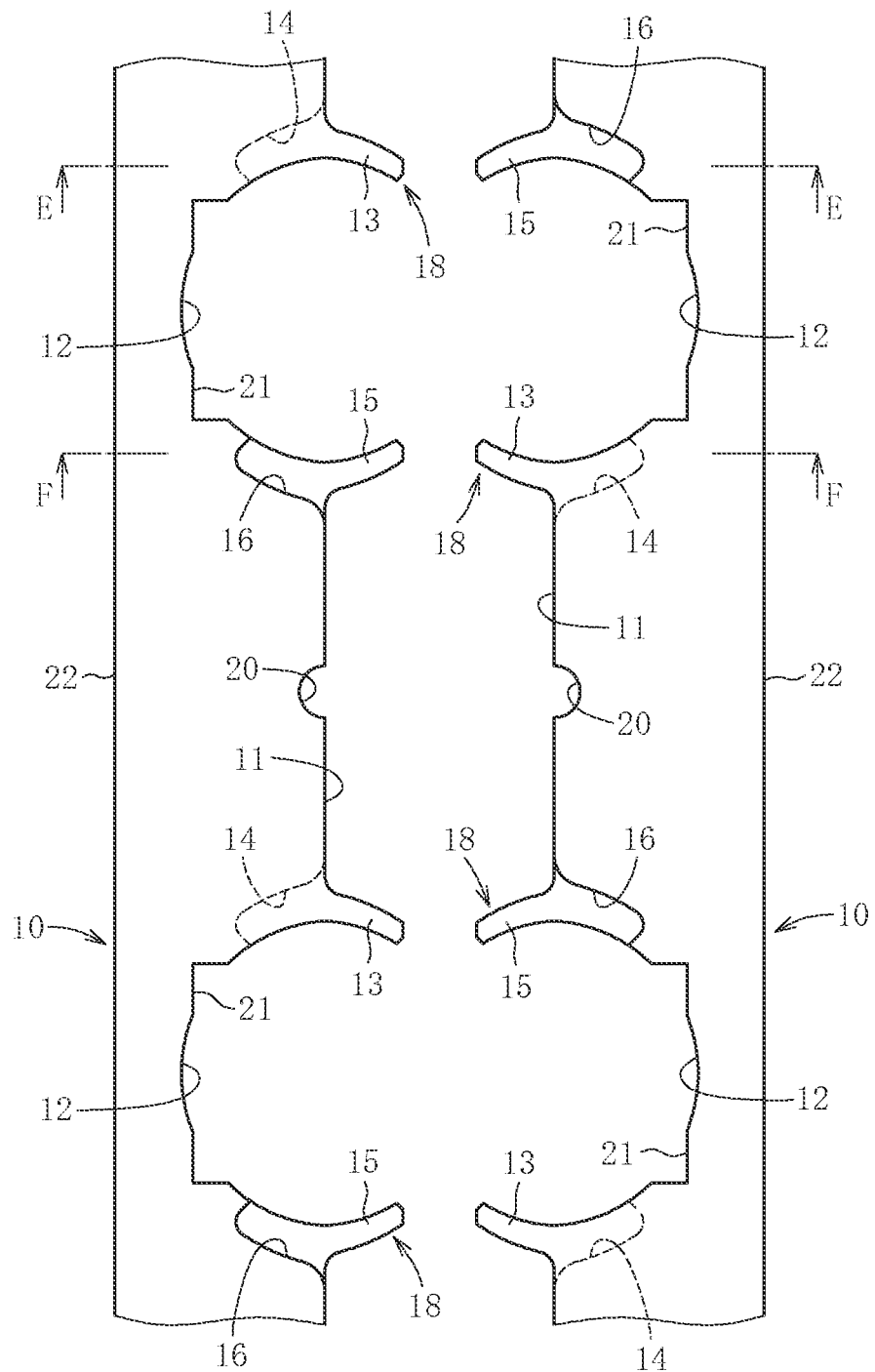
FIG. 7 is a partially developed view of the two annular members before the coupling.
Figure 8:
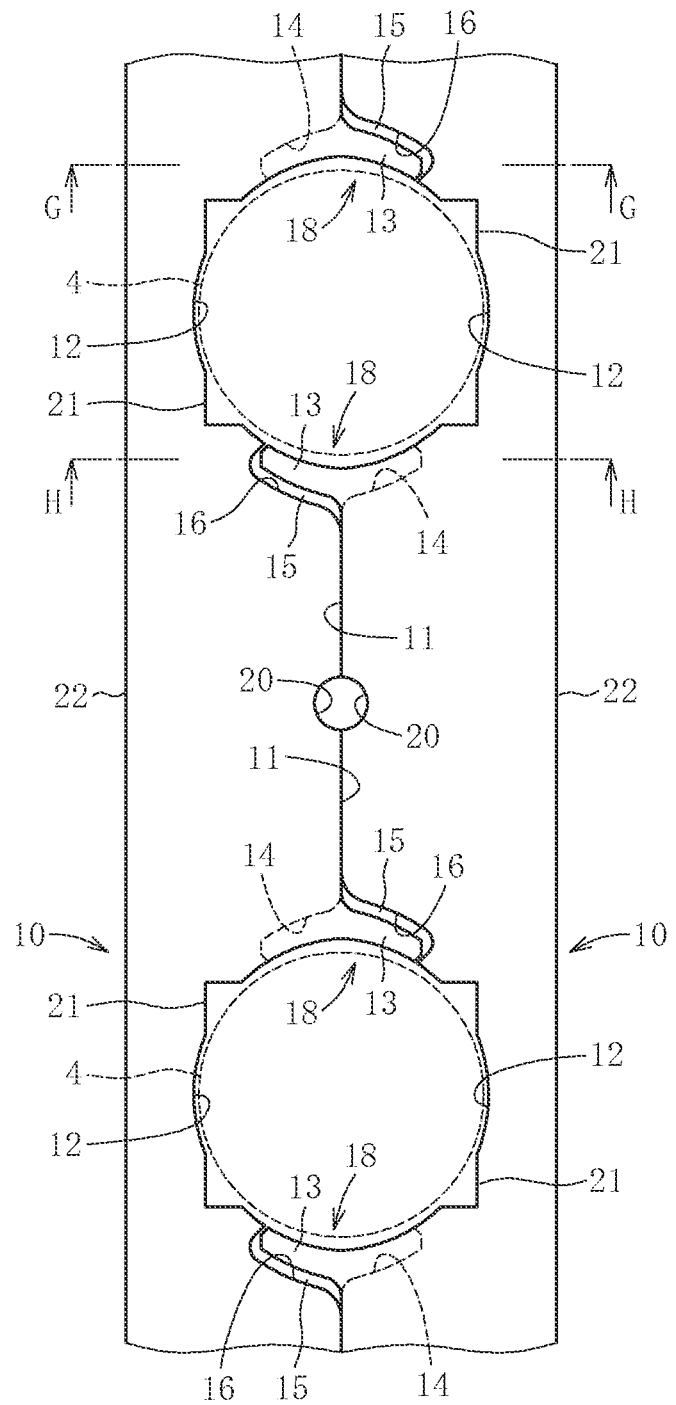
FIG. 8 is a partially developed view of the two annular members after the coupling.

The recessed grooves 19 and 20 exemplified in the embodiment illustrated in FIGS. 1 to 4 each have the circular-arc shape in cross-section. However, the sectional shape may comprise an elliptical shape, a V-shape, and an angular shape. FIGS. 5 to 8 illustrate another embodiment of the present invention. FIGS. 5 and 7 illustrate a state before the two annular members 10 are coupled to each other, and FIGS. 6 and 8 illustrate a state after the two annular members 10 are coupled to each other. As illustrated in FIGS. 5 to 8, in the example of this embodiment, the inner peripheral surface of the pocket 12 has lubricating-oil relief recessed grooves 21 each having the angular shape in cross-section. The recessed grooves 21 are formed at two positions on the inner peripheral surface of the pocket 12 of each of the annular members 10 in a manner of extending in the radial direction.

In the retainer 5 of those embodiments, the lubricating-oil relief recessed grooves 19 or 21 are provided in the inner peripheral surface of the pocket 12, and hence a lubricating-oil relief portions can be formed on a pocket inner side. In other words, a gap between a radially outer surface of the ball 4 and the inner peripheral surface of the pocket 12 is enlarged, with the result that the lubricating oil more smoothly flows through the gap. Thus, resistance against shearing by the balls 4 with respect to the lubricating oil can be suppressed, with the result that torque can be easily reduced. In this way, when the recessed groove 20 is provided in the opposed surface 11 of the annular member 10 in addition to the recessed grooves 19 or 21 provided in the inner peripheral surface of the pocket 12, resistance generated at the time of passage of the lubricating oil can be reduced, and hence an amount of an oil film can be reduced. In addition, excess lubricating oil and foreign matter can be discharged to the outside.

Here, the recessed grooves 19 or 21 are formed in the inner peripheral surface of the pocket 12 in a cut-out manner between a radially outer side and a radially inner side, and hence the lubricating oil more smoothly passes through the enlarged gap between the radially outer surface of the ball 4 and the inner peripheral surface of the pocket 12. Further, in those embodiment, the recessed grooves 19 or 21 are provided at the two positions on the inner peripheral surface of the pocket 12 of each of the annular members 10, but the position and the number of the recessed grooves 19 or 21 may be arbitrarily determined. Note that, when an end surface 22 on a counter-coupling side of each of the annular members 10 is formed into a flat shape, agitation resistance of the lubricating oil can be reduced, and hence torque can be further reduced.

Figure 9:
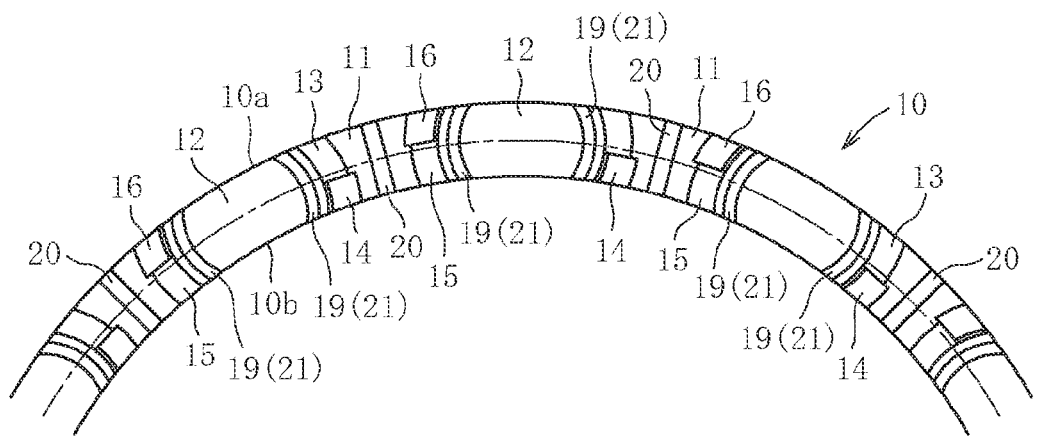
FIG. 9 is a partial side view illustrating an example of one of the annular members before the coupling.
Figure 10:
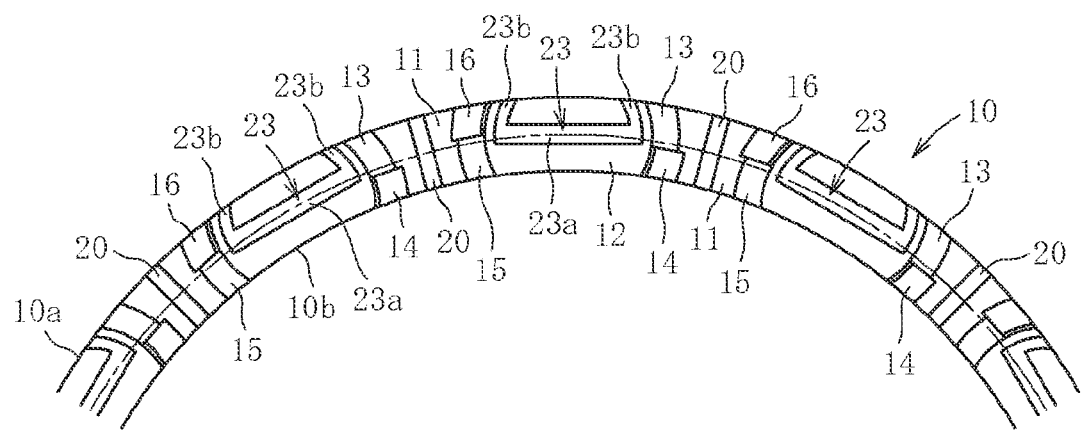
FIG. 10 is a partial side view illustrating another example of one of the annular members before the coupling.

Further, in the embodiments described above, description is made of the case of forming, as illustrated in FIG. 9, the recessed grooves 19 or 21 each extending from the radially inner surface 10b of the annular member 10 and reaching the radially outer surface 10a thereof, and being opened in both the radially inner surface 10b and the radially outer surface 10a of the annular member 10. Alternatively, as illustrated in FIG. 10, a recessed groove 23 having a C-shape may be provided in the inner peripheral surface of each of the pockets 12. The recessed groove 23 of a retainer of this embodiment comprises a central main-body groove 23a extending along the circumferential direction of the pocket, and minor grooves 23b provided continuously with end portions of the central main-body groove 23a and opened in the radially outer surface 10a of the annular member 10.

The recessed groove 23 having the C-shape can also form a lubricant relief portion on the pocket inner side. Thus, the same function and advantages as those of the retainer of the embodiment illustrated in FIG. 9 can be obtained. A sectional shape of the recessed groove 23 may comprise, other than the circular-arc shape, the elliptical shape, the V-shape, and the angular shape.

The retainer 5 of each of the embodiments described above comprises the following coupling structure as means for coupling the two annular members 10 to each other.

As illustrated in FIGS. 1, 3, 5, and 7, the two annular members 10 each comprise radially outer side projecting portions 13 each formed by axially extending a radially outer side of one of the circumferential end portions of each of the pockets 12, and radially inner side recessed portions 14 each formed by recessing a radially inner side thereof. In addition, the two annular members 10 each comprise radially inner side projecting portions 15 each formed by axially extending a radially inner side of another of the circumferential end portions of each of the pockets 12, and radially outer side recessed portions 16 each formed by recessing a radially outer side thereof.

In this way, the two annular members 10 each comprise the radially outer side projecting portions 13 and the radially inner side recessed portions 14 that are formed at the one of the circumferential end portions of each of the pockets 12, and the radially inner side projecting portions 15 and the radially miter side recessed portions 16 that are formed at the another of the circumferential end portions thereof. Through employment of this structure, annular members 10 of one type, which are manufactured with the same die set, can be used as the one of the annular members 10 and the another of the annular members 10. As a result, manufacturing cost can be reduced.

Figure 11:
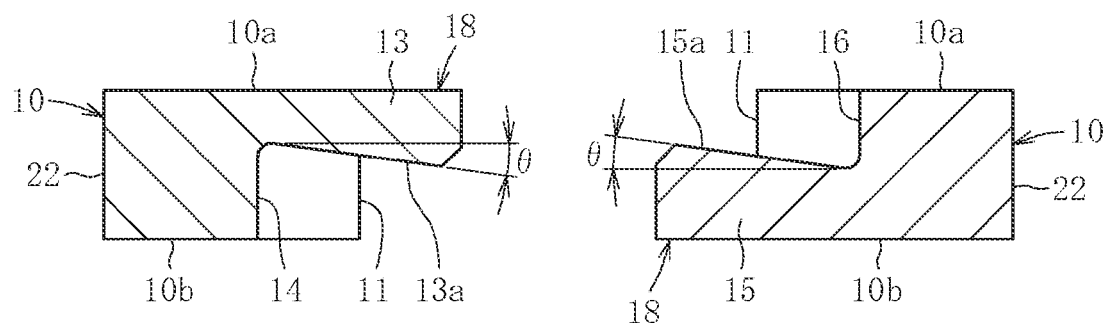
FIG. 11 is a sectional view taken along the line A-A of FIG. 3 and the line E-E of FIG. 7.
Figure 12:
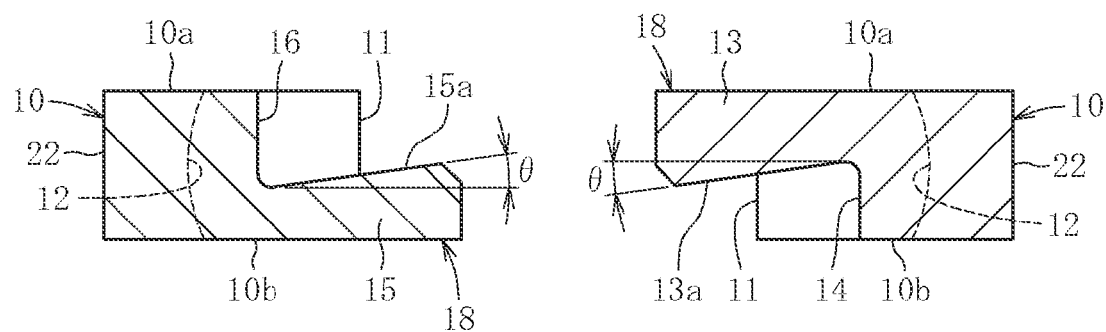
FIG. 12 is a sectional view taken along the line B-B of FIG. 3 and the line F-F of FIG. 7.

In this structure, the radially outer side projecting portions 13 of the one of the annular members 10 are inserted into the radially outer side recessed portions 16 of the another of the annular members 10, and the radially inner side projecting portions 15 of the one of the annular members 10 are inserted into the radially inner side recessed portions 14 of the another of the annular members 10. In this way, the radially outer side projecting portions 13 and the radially inner side projecting portions 15 are engaged with each other in the axial direction. Further, engagement surfaces 13a and 15a of the radially outer side projecting portions 13 and the radially inner side projecting portions 15 are inclined with respect to the axial direction in a manner that the radially outer side projecting portions 13 and the radially inner side projecting portions 15 are each thicker on a distal end side than on a proximal end side (refer to FIGS. 11 and 12).

As illustrated in FIGS. 2, 4, 6, and 8, the respective opposed surfaces 11 of the two annular members 10 are snap-fitted to each other, and the radially outer side projecting portions 13 and the radially inner side projecting portions 15 are engaged with each other with a predetermined amount of interference in the axial direction. As a result, a frictional force is generated along each of the engagement surfaces 13a and 15a of the radially outer side projecting portions 13 and the radially inner side projecting portions 15. Further, the engagement surfaces 13a and 15a of the radially outer side projecting portions 13 and the radially inner side projecting portions 15 are inclined with respect to the axial direction in a manner that the radially outer side projecting portions 13 and the radially inner side projecting portions 15 are each thicker on the distal end side than on the proximal end side. As a result, an axial component of a reactive force generated in a normal direction of each of the engagement surfaces 13a and 15a of the radially outer side projecting portions 13 and the radially inner side projecting portions 15 is provided.

The frictional force generated along each of the engagement surfaces 13a and 15a of the radially outer side projecting portions 13 and the radially inner side projecting portions 15, and the axial component of the reactive force generated in the normal direction of each of the engagement surfaces 13a and 15a are applied synergistically with each other. Thus, even when a great centrifugal force is applied due to high rotation, the two annular members 10 are reliably prevented from being separated from each other in the axial direction.

In this way, the coupling portions 18 formed of the radially outer side projecting portions 13, the radially inner side recessed portions 14, the radially inner side projecting portions 15, and the radially outer side recessed portions 16 are provided at both the circumferential end portions of the pockets 12 of the annular members 10. With this, in the case where a great centrifugal force is applied due to high rotation, even when the one of the annular members 10 and the another of the annular members 10 are to be separated from each other toward an outer side in the axial direction and the pockets 12 are to be opened, the coupling portions 13 described above easily keep the balls 4 received in the pockets 12.

In the coupling structure of those embodiments, inclination angles θ (refer to FIGS. 11 and 12) of the engagement surfaces 13a and 15a of the radially outer side projecting portions 13 and the radially inner side projecting portions 15 each need to be set to 5° or more. When the inclination angles θ are set to this value, deformation of the engagement surfaces 13a and 15a at the time of application of a great centrifugal force due to high rotation can be easily suppressed. As a result, the axial component of the reactive force can be reliably applied to the engagement surfaces 13a and 15a, and hence a force of coupling the two annular members 10 to each other can be easily secured. Note that, when the inclination angles θ of the engagement surfaces 13a and 15a are each less than 5°, in the case where a great centrifugal force is applied due to high rotation, the deformation of the engagement surfaces 13a and 15a is difficult to suppress. As a result, the axial component of the reactive force is difficult to reliably apply to the engagement surfaces 13a and 15a.

Figure 13:
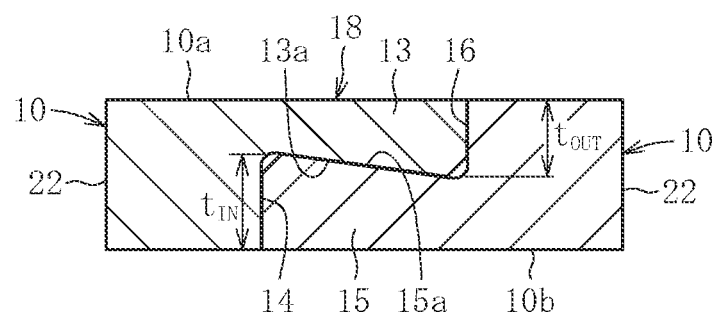
FIG. 13 is a sectional view taken along the line C-C of FIG. 4 and the line G-G of FIG. 8.
Figure 14:
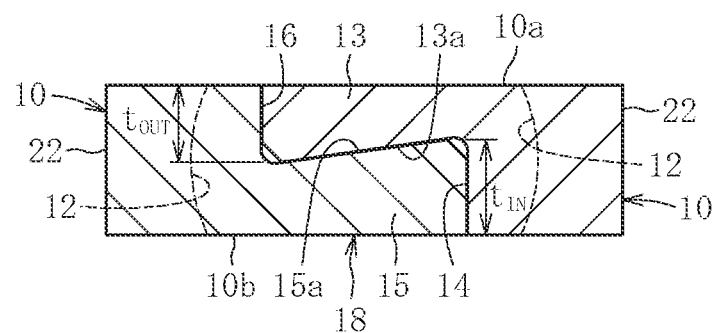
FIG. 14 is a sectional view taken along the line D-D of FIG. 4 and the line H-H of FIG. 8.

Further, in this coupling structure, as illustrated in FIGS. 13 and 14, the radially inner side projecting portions 15 are formed to be thicker than the radially outer side projecting portions 13 ($t_{IN} > t_{OUT}$). When the radially inner side projecting portions 15 are formed to be thicker than the radially outer side projecting portions 13 in this way, at the time of the application of a great centrifugal force due to high rotation, the radially inner side projecting portions 15 are deformed more significantly than the radially outer side projecting portions 13. This is because the radially inner side projecting portions 15 are larger than the radially outer side projecting portions 13 not only in thickness but also in mass. Here, the engagement surfaces 13a and 15a of the radially outer side projecting portions 13 and the radially inner side projecting portions 15 are inclined with respect to the axial direction in a manner that the radially outer side projecting portions 13 and the radially inner side projecting portions 15 are each thicker on the distal end side than on the proximal end side. Thus, the radially inner side projecting portions 15 are deformed to increase a force of coupling the engagement surfaces 13a and 15a of the radially outer side projecting portions 13 and the radially inner side projecting portions 15 to each other.

Note that, the two annular members 10 described above are each made of a synthetic resin so as to reduce a weight of the retainer 5. The two annular members 10 may be made of this kind of generally used resin excellent in abrasion resistance, seizure resistance, and the like, and examples thereof include synthetic resins such as a polyethylene, a polyamide, a polyacetal, a polyethylene terephthalate, a polybutylene terephthalate, a polycarbonate, a polyphenylene sulfide, a polyether sulfone, a polyether imide, a polyamide imide, a polyether ether ketone, a thermoplastic polyimide, a thermosetting polyimide, an epoxy resin, and a phenol resin. Further, it is possible to employ one including a thermoplastic resin such as a polyamide, a polyphenylene sulphide, or a polyether ether ketone as a base material and glass fiber added for strength improvement and dimensional stability.

In consideration of cost and oil resistance, any one selected from the following resins is suitable as the synthetic resin for forming the annular members 10 of the present invention: polyamide resins (e.g., PA46, PA66, PA9T, PA11, and PA6), polyether ether ketone resins (PEEK), polyphenylene sulfide resins (PPS), polyphthalamide resins (PPA), and polyamide imide resins (PAI), which are excellent in tensile elongation, tensile strength, impact resistance, abrasion resistance, lubricating property, and the like. In this way, polyamide resins or the like excellent in tensile elongation, tensile strength, impact resistance, abrasion resistance, lubricating property, and the like can be used in the present invention to provide a high quality retainer. Note that, the outer race 3, the inner race 2, and the ball 4 are made of metal such as ball bearing steel or carburized steel.

Grease to be filled in the ball bearing is a semisolid lubricating oil formed of a base oil, a thickening agent, and an additive. The base oil constituting the grease is not particularly limited as long as it is an oil generally used as base oil of grease, and examples thereof include: mineral oils such as a paraffin-based mineral oil and a naphthene-based mineral oil; hydrocarbon-based synthetic oils such as a polybutene, a poly-α-olefin, an alkylbenzene, an alkylnaphthalene, and an alicyclic compound; and a natural fat and oil, a polyol ester oil, a phosphate ester, a diester oil, a polyglycol oil, a silicone oil, a polyphenyl ether oil, an alkyldiphenyl ether oil, and a fluorinated oil as a nonhydrocarbon-based synthetic oil.

Examples of the thickening agent include: metal soap-based thickening agents such as aluminum soap, lithium soap, sodium soap, complex lithium soap, complex calcium soap, and complex aluminum soap; and urea-based compounds such as a diurea compound and a polyurea compound. Those thickening agents may be used alone, or two or more kinds thereof may be used in combination. In addition, as a known additive for the lubricating grease, there are given, for example: an extreme pressure agent; an antioxidant such as an amine-based or a phenol-based antioxidant; a metal deactivator such as benzotriazole; a viscosity index improver such as a polymethacrylate or a polystyrene; and a solid lubricating oil such as molybdenum disulfide or graphite. Those additives may be used alone, or two or more kinds thereof may be used in combination.

Figure 16:
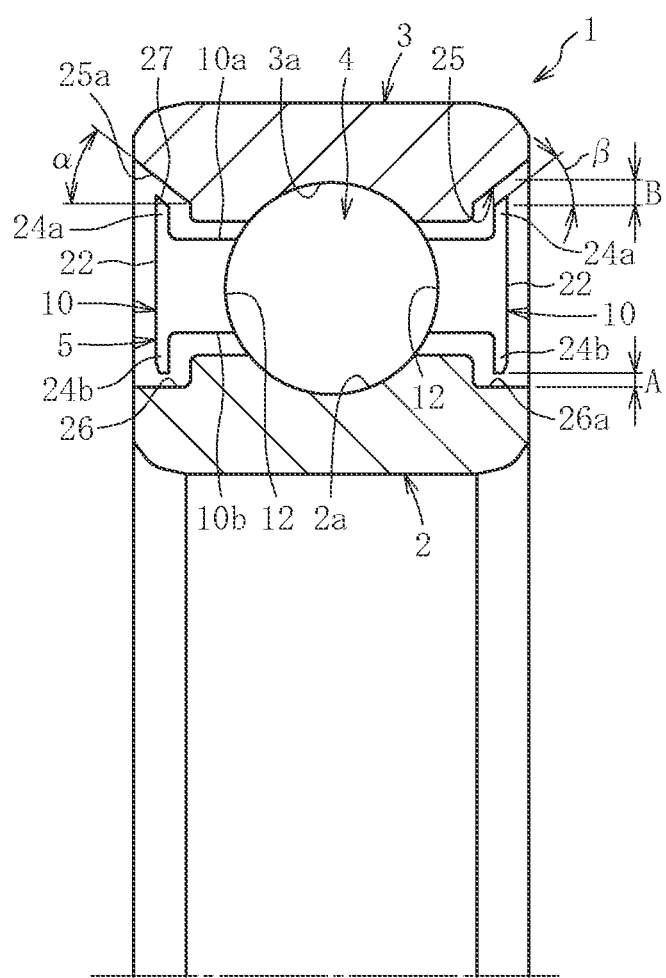
FIG. 16 is a partial sectional view illustrating another example of the ball bearing incorporating the retainer of the present invention.

In the embodiments described above, the sealed ball bearing 1 (refer to FIG. 15) comprises the retainer 5 formed of the annular members 10 illustrated in FIGS. 1 to 14. However, the present invention is applicable not only to the sealed ball bearing but also to ball bearings of other types, such as a ball bearing 1 comprising flange portions 24a and 24b provided on a radially outer portion and a radially inner portion on the counter-coupling side of annular members 10 as illustrated in FIG. 16. Note that, the annular members exemplified in the embodiments illustrated in FIGS. 1 to 14 do not comprise flange portions, but there may be employed a structure in which a radially outer portion and a radially inner portion on the counter-coupling sides of the annular members 10 of FIGS. 1 to 14 may comprise the flange portions.

The ball bearing 1 illustrated in FIG. 16 comprises the outer flange portions 24a provided to the radially outer portion on the counter-coupling side of each of the annular members 10 and extending to a radially outer side of the bearing, and the inner flange portions 24b provided to the radially inner portion on the counter-coupling side of each of the annular members 10 and extending to a radially inner side of the bearing. In this case, the end surface 22 on the counter-coupling side is formed into a flat shape (flat surface) parallel to an end surface in the axial direction of the bearing, and a radially inner portion on the counter-coupling side of each of the inner flange portions 24b is formed into a tapered surface inclined on the counter-coupling side in a range from the radially outer side toward the radially inner side. As recesses in conformity with the flange portions 24a and 24b, circumferential cutout portions 25 are provided along axial end portions of a radially inner surface of the outer race 3, and circumferential cutout portions 26 are provided along axial end portions of a radially outer surface of the inner race 2.

The circumferential cutout portions 26 of the inner race 2 each have a rectangular shape in cross-section, and a cutout surface of each of the circumferential cutout portions 25 of the outer race 3 is formed into an outer race tapered surface 25a radially expanding from an axially inner side toward an axially outer side. A taper angle α thereof is set to, for example, approximately 20° to 45°. Further, in conformity with the tapered surface 25a, a radially outer end of each of the outer flange portions 24a is formed into a flange tapered surface 27 radially expanding from the axially inner side toward the axially outer side. A taper angle β of the tapered surface 27 is set to be substantially equal to the taper angle α of the outer race tapered surface 25a. In addition, a predetermined clearance B is secured between the outer race tapered surface 25a and the tapered surface 27.

In this case, a predetermined clearance A is similarly secured between a cutout surface 26a of each of the circumferential cutout portions 26 of the inner race 2 and the inner flange portion 24b. The clearance A is set to be equal to or smaller than the clearance B between the tapered surface 25a and the tapered surface 27 (B≥A). Note that, the clearance B corresponds to a radial dimension between a radially outer end of the outer flange portion 24a and the tapered surface 25a. For example, when A is set to approximately 0.5 mm to 1.2 mm, B is preferably set to approximately 0.7 mm to 2.0 mm.

The outer flange portions 24a and the inner flange portions 24b are provided as described above, and hence it is possible to restrict inflow of the lubricating oil into an inside of the bearing, and to prevent outflow of the lubricating oil from the inside to the outside of the bearing. In particular, by satisfying the relationship of B≥A, foreign matter that may remain in the inside of the bearing can be discharged to the outside while preventing the outflow of the lubricating oil to the outside of the bearing. Further, the outer end portion in the bearing axial direction of the radially inner surface of the outer race 3 and the radially outer end of the outer flange portion are respectively formed into the tapered surfaces 25a and 27. With this, the foreign matter can be more effectively discharged to the outside. Note that, the taper angles α and β are set to approximately 20° to 45°, but may be set within a range from 20° to 45°, or may be set beyond this range as long as the function to "discharge, to the outside, foreign matter that may remain in the inside while preventing the outflow of the lubricant to the outside" can be exerted.

Figure 17:
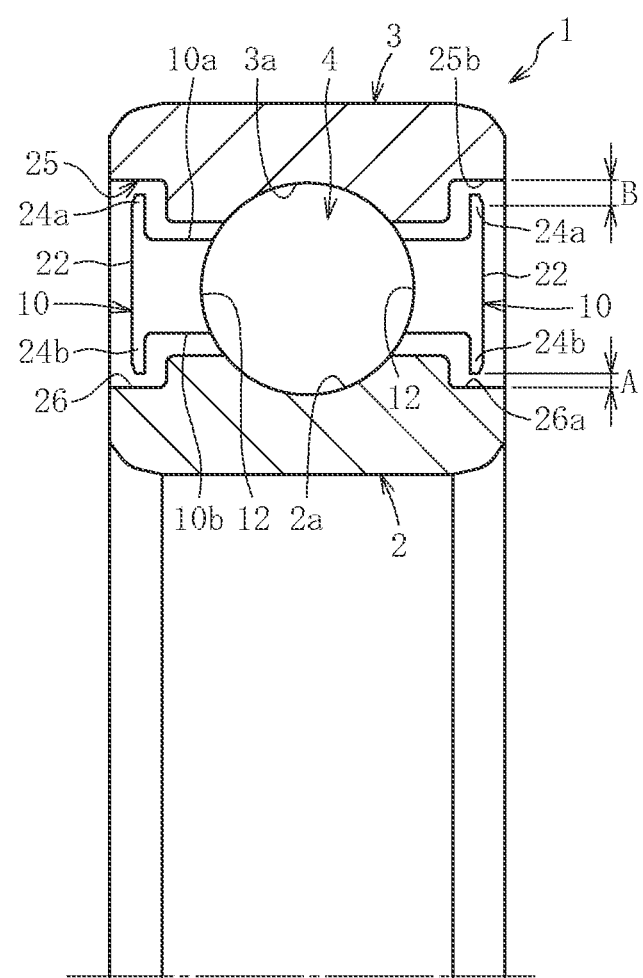
FIG. 17 is a partial sectional view illustrating still another example of the ball bearing incorporating the retainer of the present invention.

Further, in the bearing, the cutout surface of each of the circumferential cutout portions 25 of the outer race 3 need not necessarily comprise the tapered surface 25a. Specifically, as illustrated in FIG. 17, the circumferential cutout portions 25 of the outer race 3 are also formed into a rectangular shape in cross-section. Thus, in conformity with a cutout surface 25b of each of the circumferential cutout portions 25, the radially outer end of each of the outer flange portions 24a is formed into an end surface parallel to the axial direction. Further, when a clearance between the outer flange portion 24a and the radially inner surface of the outer race 3 (in this case, the cutout surface 25b of each of the circumferential cutout portion 25) is represented by B, and a clearance between the inner flange portion 24b and the radially outer surface of the inner race 2 (in this case, the cutout surface 26a of each of the circumferential cutout portions 26) is represented by A, the relationship of B≥A is satisfied. Also in this case, for example, when A is set to approximately 0.5 mm to 1.2 mm, B is preferably set to approximately 0.7 mm to 2.0 mm.

Thus, also in this bearing, when the outer flange portions 24a and the inner flange portions 24b are provided, it is possible to restrict inflow of the lubricating oil into an inside of the bearing, and to prevent outflow of the lubricating oil from the inside to the outside of the bearing. In particular, by satisfying the relationship of B≥A, foreign matter that may remain in the inside can be discharged to the outside while preventing the outflow of the lubricating oil to the outside.

Other structural details of the ball bearing 1 illustrated in FIGS. 16 and 17 are the same as those of the ball bearing 1 illustrated in FIG. 15. Thus, in FIGS. 16 and 17, the same parts as those in FIG. 15 are denoted by the same reference symbols, and redundant description thereof is omitted.

Note that, the present invention, is not limited to the embodiments described above, and various modifications may be made thereto. Sizes, depths, and the like of the recessed grooves 19 to 21 and 23 may be variously changed in accordance, for example, with a type of the lubricating oil to be used as long as both the resistance generated at the time of passage of the lubricating oil and the amount of the oil film to be sheared can be reduced. Thus, the number of the recessed grooves 19 or 21 formed in the inner peripheral surface of each of the pockets 12 is not limited to two, and may comprise one, or three or more. Similarly, the number of the recessed grooves 20 formed in the opposed surfaces 11 of each of the annular members 10 is not limited to one, and may comprise two or more. In addition, the recessed groove 20 need not necessarily be formed in each of all the opposed surfaces 11, and may be formed in arbitrary one of the opposed surfaces 11.

As in the embodiment described above, in order to exert the function to "restrict inflow of the lubricant into the inside of the bearing and prevent outflow of the lubricant from the inside to the outside of the bearing," the flange portions 24a and 24b are preferably provided. However, any one of the outer flange portion 24a and the inner flange portion 24b may be omitted, or both the flange portion 24a and the flange portion 24b may be omitted. When the flange portions 24a and 24b are provided, a thickness, a radial length dimension, and the like of each of the flange portions 24a and 24b are set in consideration of a balance during rotation, a strength, a weight, the clearances A and B, and the like. Meanwhile, sizes, shapes, and the like of the circumferential cutout portions 25 and 26 are set in consideration of the thickness, the radial length dimension, and the like of each of the flange portions 24a and 24b. Note that, the number of the pockets 12 for retaining the balls 4 may be arbitrarily increased or reduced.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

The invention claimed is:

1. A ball bearing retainer comprising two annular members that face each other in a bearing axial direction, the two annular members having opposed surfaces each comprising hemispherical pockets that are formed at a plurality of positions in a circumferential direction of the annular members and configured to receive balls, the opposed surfaces being snap-fitted to each other so as to couple the two annular members to each other with coupling portions provided at both circumferential end portions of each of the hemispherical pockets, wherein the hemispherical pockets each comprise lubricating-oil relief recessed grooves provided in an inner peripheral surface thereof, wherein the coupling portions each comprise:

a radially outer side projecting portion formed by axially extending a radially outer side of the circumferential end portion of each of the hemispherical pockets of one of the two annular members so as to allow an inner peripheral surface of the radially outer side projecting portion to abut against the balls;

a radially inner side recessed portion formed by recessing a radially inner side of the circumferential end portion;

a radially inner side projecting portion formed by axially extending a radially inner side of the circumferential end portion of each of the hemispherical pockets of another of the two annular members so as to allow an inner peripheral surface of the radially inner side projecting portion to abut against the balls; and a radially outer side recessed portion formed by recessing a radially outer side of the circumferential end portion, wherein the radially outer side projecting portion and the radially inner side projecting portion are engaged with each other in the bearing axial direction b inserting the radially outer side projecting portion into the radially outer side recessed portion and by inserting the radially inner side projecting portion into the radially inner side recessed portion, and wherein an engagement surface of the radially outer side projecting portion and an engagement surface of the radially inner side projecting portion are inclined with respect to the bearing axial direction in a manner that the radially outer side projecting portion and the radially inner side projecting portion are each thicker on a distal end side than on a proximal end side.

2. The ball bearing retainer according to claim 1, wherein the lubricating-oil relief recessed grooves are each formed to extend from a radially inner surface and reach to a radially outer surface of each of the two annular members.

3. The ball bearing retainer according to claim 2, wherein the lubricating-oil relief recessed grooves each have a circular-arc shape in cross-section.

4. The ball bearing retainer according to claim 2, wherein the lubricating-oil relief recessed grooves each have an angular shape in cross-section.

5. The ball bearing retainer according to claim 2, wherein the opposed surfaces of the two annular members each comprise a recessed groove that extends from the radially inner surface and reaches to the radially outer surface of each of the two annular members.

6. The ball bearing retainer according to claim 1, wherein the lubricating-oil relief recessed grooves each have a circular-arc shape in cross-section.

7. The ball bearing retainer according to claim 1, wherein the lubricating-oil relief recessed grooves each have an angular shape in cross-section.

8. The ball bearing retainer according to claim 1, wherein the lubricating-oil relief recessed grooves each have a C-shape comprising:
a central main-body groove extending along the circumferential direction of the hemispherical pockets; and
minor grooves provided continuously with end portions of the central main-body groove and opened in a radially outer surface of each of the two annular members.

9. The ball bearing retainer according to claim 1, wherein the opposed surfaces of the two annular members each comprise a recessed groove that extends from a radially inner surface and reaches to a radially outer surface of each of the two annular members.

10. The ball bearing retainer according to claim 1, wherein an end surface on a counter-coupling side of each of the two annular members has a flat shape.

11. The ball bearing retainer according to claim 1, wherein, in each of the coupling portions, an inclination angle of the engagement surface of the radially outer side projecting portion and an inclination angle of the engagement surface of the radially inner side projecting portion are each set to 5° or more.

12. The ball bearing retainer according to claim 1, wherein, in each of the coupling portions, the radially inner side projecting portion is formed to be thicker than the radially outer side projecting portion.

13. The ball bearing retainer according to claim 1, wherein, in each of the coupling portions, the radially outer side projecting portion and the radially inner side recessed portion are formed at one of the circumferential end portions of each of the hemispherical pockets, and the radially inner side projecting portion and the radially outer side recessed portion are formed at another of the circumferential end portions of each of the hemispherical pockets.

14. The ball bearing retainer according to claim 1, wherein the two annular members are each made of a synthetic resin.

15. The ball bearing retainer according to claim 14, wherein the synthetic resin comprises any one selected from a polyamide resin, a polyether ether ketone resin, a polyphenylene sulfide resin, a polyphthalamide resin, and a polyamide imide resin.

16. A ball bearing, comprising:
the ball bearing retainer according to claim 1;
an outer race;
an inner race; and
balls interposed between the outer race and the inner race,
wherein the outer race and the inner race are rotatable relative to each other.

17. The ball bearing according to claim 16, further comprising:
an outer flange portion provided to a radially outer portion on a counter-coupling side of each of the two annular members and extending to the radially outer side; and
an inner flange portion provided to a radially inner portion on the counter-coupling side of each of the two annular members and extending to the radially inner side,
wherein, when a clearance between the outer flange portion and a radially inner surface of the outer race is represented by B, and a clearance between the inner flange portion and a radially outer surface of the inner race is represented by A, a relationship of B≥A is satisfied.

18. The A-ball bearing according to claim 16, further comprising:
an outer flange portion provided to a radially outer portion on a the counter-coupling side of each of the two annular members and extending to the radially outer side; and
an inner flange portion provided to a radially inner portion on the counter-coupling side of each of the two annular members and extending to the radially inner side,
wherein outer end portions in a bearing axial direction of a radially inner surface of the outer race each comprise an outer race tapered surface radially expanding from an axially inner side toward an axially outer side,
wherein a radially outer end of the outer flange portion comprises a flange tapered surface radially expanding from the axially inner side toward the axially outer side, and
wherein, when a clearance between the flange tapered surface and the outer race tapered surface is represented by B, and a clearance between the inner flange portion and a radially outer surface of the inner race is represented by A, a relationship of B≥A is satisfied.

* * * * *